United States Patent [19]

Meihack et al.

[11] Patent Number: 5,114,700
[45] Date of Patent: May 19, 1992

[54] ELECTRICALLY HEATED FLUIDIZED BED REACTOR AND PROCESSES EMPLOYING SAME

[75] Inventors: Wolfgang F. A. T. Meihack; Nicholas A. Barcza, both of Randburg; Michael J. Dry, Weltevreden Park, all of South Africa

[73] Assignee: Mintek, Randburg, South Africa

[21] Appl. No.: 520,541

[22] Filed: May 8, 1990

Related U.S. Application Data

[60] Continuation-in-part of Ser. No. 120,605, Nov. 16, 1987, abandoned, which is a division of Ser. No. 909,102, Sep. 18, 1986, abandoned.

[30] Foreign Application Priority Data

Sep. 20, 1985 [ZA] South Africa ............... 85/7234

[51] Int. Cl.$^5$ .................................. C01B 17/06
[52] U.S. Cl. ..................... 423/571; 423/153; 423/567 R; 423/DIG. 11; 422/141; 422/142; 422/146; 392/478; 165/1; 165/104.16; 165/172; 23/313 FB
[58] Field of Search ......... 392/478; 423/567 R, 423/571, 148, 153, DIG. 16; 422/141, 142, 146; 165/1, 104.16, 172; 23/313 FB

[56] References Cited

U.S. PATENT DOCUMENTS

| | | | |
|---|---|---|---|
| 2,584,391 | 2/1952 | Lefer | 422/146 |
| 3,735,498 | 5/1973 | Suzukawa et al. | 34/10 |
| 3,754,993 | 8/1973 | Oguchi et al. | 208/213 |
| 3,915,822 | 10/1975 | Veltman | 204/151 |

OTHER PUBLICATIONS

British Chem. Engineering, vol. 10, No. 4, Apr. 1965, pp. 258, 260 and 262.

*Primary Examiner*—Anthony McFarlane
*Attorney, Agent, or Firm*—Bucknam and Archer

[57] ABSTRACT

A method of carrying out a chemical reaction in a fluidized bed reactor is provided wherein the reactants include at least one finely sub-divided reactant having a particle size substantially smaller than that of the particles constituting the fluidized bed. The reactor includes a downcomer compartment and a riser compartment operated such that the fluidized bed particles circulate by moving down the downcomer compartment and up the riser compartment. The finely divided solid reactant is introduced, either as such, or in an agglomerated form, into the central or upper region of the fluidized bed in the downcomer compartment such that it becomes entrained in the downwardly moving fluidized bed in the downcomer compartment and moves countercurrent to the fluidizing gas towards the lower end of the riser compartment. The reaction products which may be, or include, fine divided solids are carried out of the top of the reactor from the riser compartment. The fluidized bed particles comprise electrically conductive particles which are heated by passing an electrical current therethrough. Other reactants, which may be solid or gaseous, can be added through the same or other inlets, or may be embodied in the fluidizing gas.

17 Claims, 4 Drawing Sheets

ELECTRICALLY HEATED FLUIDIZED BED REACTOR AND PROCESSES EMPLOYING SAME

RELATED APPLICATIONS

This application is a continuation-in-part application of application Ser. No. 07/120,605 filed Nov. 16, 1987, now abandoned, which in turn is a division of application Ser. No. 06/909,102 filed Sep. 18, 1986, (now abandoned).

FIELD OF THE INVENTION

This invention relates to a method of conducting a chemical reaction in a fluidised bed reactor and, more particularly, endothermic chemical reactions wherein at least one reactant is a finely sub-divided solid reactant, and at least a portion of the supplementary thermal energy of reaction required is provided by passing an electrical current through the fluidised bed. Such a fluidised bed, contains a sufficient proportion of electrically conductive particles to allow for the passage of such an electrical current through the bed to result in resistive heating thereof.

BACKGROUND TO THE INVENTION

It is well known that fluidised bed reactors have many applications but with particular bias towards exothermic chemical ractions which often require no supplementary thermal energy to be supplied to enable the reaction to proceed. Mildly endothermic reactions can also be carried out in a fluidised bed reactor and any supplementary thermal energy required has, in the past, generally been provided by fluidising the bed with preheated gases, which may be combustion gases, or by actually combusting material within the fluidised bed to generate such heat.

One alternative form of heating which has been proposed and implemented commercially in a process for producing hydrogen cyanide from methane and ammonia, is a fixed fluidised bed consisting of particles of coke or char. The heating is effected by passing an electrical current through the coke or char to generate, resistively, the required heat. It must be noted that in this process all the reactants and products are gaseous.

Other reactions that have been carried out in a resistance heated fluidised bed is the gasification of coal char using steam to produce carbon monoxide and hydrogen and the formation of ultra-microcrystallite silicon carbon on the surface of carbon particles fluidised together with silicon dioxide. In the former case the products are gaseous and in the latter, the solid product is recovered from the carbon particles in a batchwise manner.

It is the object of this invention to provide a method of carrying out chemical reactions in a fluidised bed reactor in which electrical resistance heating is employed but wherein a reactant, and optionally a reaction product, can be in the form of solid particles and can be added and removed in a continuous or semi-continuous manner.

SUMMARY OF THE INVENTION

In accordance with this invention there is provided a method of carrying out an endothermic chemical reaction involving the use of at least one solid reactant in a fluidised bed reactor, wherein the reactor comprises a vessel assembly comprising at least one riser compartment and a down-comer compartment located adjacent each other and being interconnected at both their lower and upper end regions; said down-comer compartment having upper, central, and lower regions; each of said compartments having associated therewith means for introducing fluidising gas therein and containing electrically conductive fluidised bed defining particles; at least a solid reactant inlet to the vessel assembly for a solid reactant in sub-divided form, wherein said inlet communicates with said upper or central region of the downcomer compartment; any additional inlets required for any other reactants; at least one outlet communicating with the upper end regions of said compartments for spent fluidising gas and accompnaying reaction products; and electrodes associated with the vessel assembly and adapted to pass an electrical current through at least a selected zone of a fluidised bed therein, the method comprising:

(a) introducing fluidising gas into the lower regions of both the downcomer and riser compartments such that, in the downcomer compartment, the fluidised bed defining particles are substantially in a state of incipient fluidisation and the superficial fluidising gas velocity in the riser compartment is at least intermittently higher than that in the downcomer compartment, to thereby cuse at least intermittent movement of fluidised bed defining particles up the riser compartment and over onto the upper region of the downcomer compartment, and a simultaneous downward movement of fluidised bed defining particles in the downcomer compartment;

(b) introducing one or more reactants through said solid reactant inlet to said upper or central region of said downcomer compartment, at least one reactant being in solid sub-divided form, to thereby cause said at least one solid reactant to become entrained with the fluidised bed defining particles and to thereby move counter-currently to the flow of fluidising gas;

(c) passing an electrical current between said electrodes to heat, by resistive heating, said fluidised bed defining particles; and, (d) removing spent fluidising gas together with reaction products accompanying same through the outlet.

Further features of the invention provide for any solid sub-divided reactant to have a substantially smaller particle size relative to that of the fluidised bed defining particles; for the average particle size of the fluidised bed defining particles to be at least five times, and preferably at least eight or ten times that of the particle size of the solid sub-divided reactant; for the solid sub-divided reactant to be optionally introduced into the downcomer compartment in agglomerated form to break down in the fluidised bed to provide the solid sub-divided particulate reactant; for the solid sub-divided reactant to be pneumatically introduced into the downcomer compartment in a carrier gas; and for the resistive heating to be effected exclusively in the downcomer compartment.

Still further features of the invention provide for the chemical reaction to provide finely divided reaction products wherein the at least intermittently higher superficial fluidising gas velocity in the riser compartment carries such reaction products out of the riser compartment, and out of the outlet, together with the spent fluidising gas; for the fluidising gas to embody at least one gaseous reactant; and for the fluidised bed defining particles to be carbonaceous, preferably graphite particles.

Further features of the invention provide for the two compartments to be either defined by two or more separate vessels interconnected at upper and lower end regions or, for the compartments to be defined by a divinding wall in one single vessel in which case the dividing wall may either define one annular compartment and one tubular compartment in the centre thereof or, alternatively, may define one compartment laterally adjacent the other; and for the electrodes to assume one of the following forms:

(i) axially spaced electrode surfaces (generally in the form of rings) either in or supported on the wall of the downcomer compartment;

(ii) a gas permeable floor to the downcomer compartment and another electrode suitable defined and spaced therefrom in or on a zone of the downcomer compartment wall;

(iii) one or more electrodes separate from the vessel assembly and extending into a suitable region of the downcomer compartment with co-operating electrodes either being a wall of the compartment or additional electrodes extending into such compartment, in particular, an arrangement of three parallel, equally angularly spaced, electrodes, extending into the downcomer compartment and adapted to be powered by a three-phase electrical supply.

The method of the invention may be applied to a wide variety of chemical reactions which may involve simply the decomposition of at least component parts of a solid sub-divided reactant, but which may also involve other reactants, in particular other solid reactants or gaseous reactants. In the case of one or more gaseous reeactants, these may be introduced together with the fluidising gas and may, even constitute the fluidising gas. Alternatively, the could be introduced at any other required location by way of existing or especially provided inlets. The resistive thermal energy generated by passing a current through the electrically conductive fluidised bed defining particles may be supplemented by a combustion reaction designed to take place within the fluidised bed during operation of the reactor, or by one of the other prior art expedients.

Whilst not being limitative on the scope of this invention, one particular application hereof is to the pyrolysis of the mineral pyrite ($FeS_2$) which decomposes on heatin to pyrrhotite ($FeS_{1+x}$) and elemental sulphur. In such an application finely sub-divided pyrite can be fed to an upper or central region of the downcomer compartment so that it becomes entrained with the fluidised conductive particles moving intermittently or continuously downwardly and thereby become heated in consequence of the electrically heated fluidised bed. In such an application the fluidising gas is oxygen-free and may be composed of nitrogem, argon, neon, or any other relatively inert gas such as carbon dioxide or steam.

In this application of the invention, the pyrite is preferably finely sub-divided and may have an average particle size or less than about 0.004 inches (100 $\mu$m). In such application the fluidised bed defining particles are preferably carbon, in particular graphite, and have an average particle size of between about 0.004 and 0.12 inches (1 to 3 mm). In this case the raction product is finely divided solids and this solid reactant is carried out of the reactor with spent fluidising gas passing up the riser column and thence together with spent fluidising gas from the downcomer compartment passes out of the outlet.

Another application of the invention of particular interest is to the reduction of metal oxides, particularly finely divided metal oxides such as chromite ores in which case the product is prereduced chromite which may be finally smelted in a furnace such as a plasma arc furnace to produce ferro-chromium.

It is important, in the carrying out of this invention, that the fluidised bed defining particles in the downcomer compartment are incipiently fluidised by which term is meant that the superficial gas velocity just causes the particles to become suspended by the gas flow but able to move downwardly in the downcomer and through to the lower end of the riser compartment. At higher gas velocities bubbles form in the fluidised bed which has a deleterious effect on the method of the invention. The concept of "bubbling" is well known in the art and described in literature.

This type of fluidisation minimises mixing and ensures that the solid reactant becomes entrained with the fluidised bed defining particles. A consequence of this is that a large degree of control may be exercised over the residence time for which the solid reactants are present in the downcomer compartment. This residence time is very much extended relative to the normal residence time in a normal, or fully fluidised bed wherein substantial mixing takes place.

It is also to be mentioned that achieving the required criteria is most effective when the cross-sectional size of the downcomer compartment is substantially greater than that of the riser compartment.

In order that the invention may be more fully understood, various methods of putting it into practice as well as one particularly important application, will now be described with reference to the accompanying drawings.

DETAILED DESCRIPTION WITH REFERENCE TO THE DRAWINGS

Figure 1:
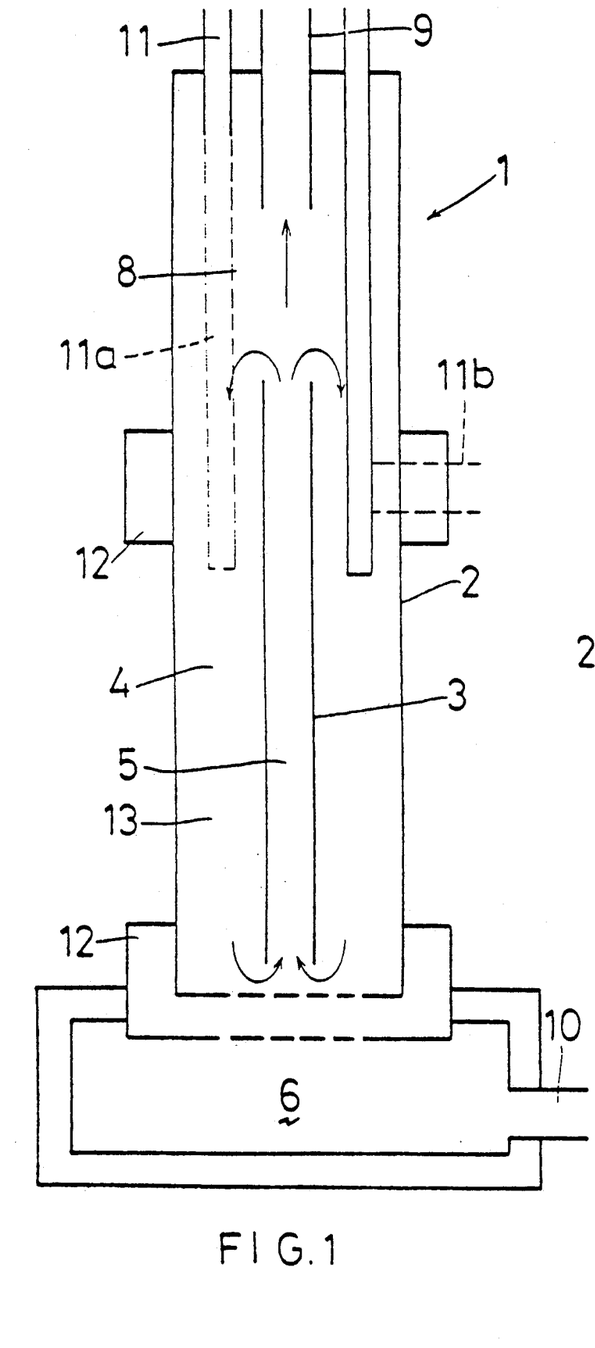
FIGS. 1, 2 & 8 are each schematic sectional elevations of fluidised bed reactors suitable for implemented the method according to this invention.

Referring firstly to FIG. 1 of the accompanying drawings, there is illustrated a fluidised bed reactor, generally indicated by numeral 1, and comprising a tubular vessel 2 having a vertical axis and being of cylindrical shape. A centrally located baffle tube 3 within the vessel, and terminating short of both ends thereof, forms a dividing wall which divides the interior of the vessel into an annular downcomer compartment 4 and a central tubular riser compartment 5.

The lowermost end of the vessel is formed into a fluidising gas distribution box 6 whilst the upper end 7 thereof forms an outlet chamber 8 having an outlet 9. The fluidising gas distribution box 6 has a gas inlet 10. A reactant inlet 11 extends downwardly from the upper end of the vessel to terminate in the upper/central region of the downcomer compartment.

The wall of the vessel is provided with a pair of annular-shaped electrodes 12 located one towards the top, and the other towards the bottom, of the downcomer compartment such that electrical flow through a fluidised mass of particles 13 can pass from one electrode to the other and thereby cause the fluidised bed to become resistively heated.

Clearly the fluidised bed defining particles must include at least a sufficient proportion of electrically conductive particles to enable the resistive heating described above to take place. Thus, it may include particles of char or coke, metallic particles, conductive pre-reduced particles (for example irn bearing fines or ferro-alloy fines) or other conductive particles which may, if in the form of fines, be agglomerated such as pelletised or granulated, if required. In any event the conductivity, and the nature of the conductive particles constituting the fluidised bed, will depend largely on the process being carried out, and the temperature which is required to be attained. Often carbonaceous, in particular graphite particles will be effective.

Similarly other variables will have to be chosen according to the electrode design and spacing, voidage of the fluidised bed, particle size and distribution, temperature, flow rates, etc.

The electrodes themselves may be made of graphite or any other suitably conductive material and, in the event that they are made of metal, they could be water cooled, if required. Various composite refractory materials, for example containing graphite or metal, could be employed.

In use, reactants, at least one of which is in the form of solid, sub-divided reactant material (which may be agglomerated, for example, pelletised or granulated), are introduced through the inlet tube 11 to become entrained in the downwardly moving fluidised bed defining particles in the downcomer compartment.

In the event that the feed material is granulated or pelletised, the inlet may terminate higher than in the case where the solid sub-divided reactant is not thus agglomerated. If the feed is in the form of fines, the inlet will terminate lower in the upper or in the central region of the fluidised bed in the downcomer compartment. In the case of the fines the inlet may extend laterally into the fluidised bed as shown in dotted lines 11b.

The fluidised gas supply is arranged such that the fluidised bed defining particles in the downcomer compartment are in a state of incipient fluidisation whilst those in the riser compartment move upwardly. As the latter takes place, the particles in the downcomer compartment move downwardly accordingly.

Bubbling in the downcomer compartment should be avoided. All the time electrical current is passed between the two electrodes to resistively heat the fluidised bed in the downcomer compartment to a required temperature.

Gaseous reaction products, will simply be carried out of the outlet 9 by the fluidising gas. Similarly fine reaction product particles will remain entrained with the fluidising gas to pass out of such outlet.

In the event that solid products are produced in a form which is not easily carried out through the outlet, the fluidising gas velocity in the riser compartment can be increased at predetermined time intervals so that the increased flow rate will carry the products through the outlet 9. It will be understood that the particles constituting the fluidised bed and which are to remain within the fluidised bed reactor should have a size and density such that they are not carried out with the fluidising gas and solid reaction products.

Figure 6:
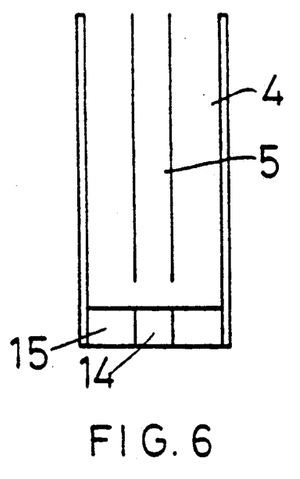
FIGS. 6 & 7 illustrate two different arrangements of the fluidising gas distribution means; and, FIG. 9 illustrates, schematically, one longer scale reactor which has been employed in exercising the method of this invention.
Figure 7:
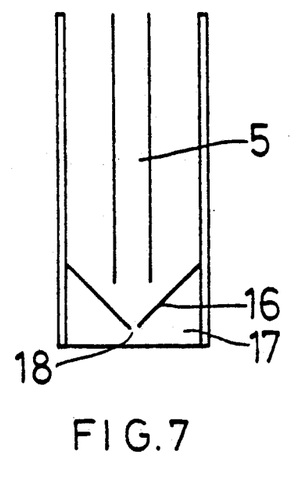

Any required expedient can be employed for ensuring that fluidising gas has a satisfactorily high velocity in the riser compartment to relative that in the downcomer compartment to ensure tha the particles constituting the fluidised bed circulate upwardly through the riser compartment and downwardly through the downcomer compartment. FIG. 6 illustrates one form of fluidising gas inlet arrangement in which separate chambers 14 and 15 are provided for introducing fluidising gas into the riser compartment 5 and downcomer compartment 4 at different rates to give rise to the required effect. Alternatively, as shown in FIG. 7, an inverted conical bottom 16 defining the top of the gas inlet chamber 17 could be provided with a central gas inlet 18 located directly beneath the riser compartment 5. A single gas inlet may also be used, with the orifices or tuyeres in the gas distribution plate or other gas distribution means suitable arranged to give the required superficial gas velocity in each compartment.

Figure 2:
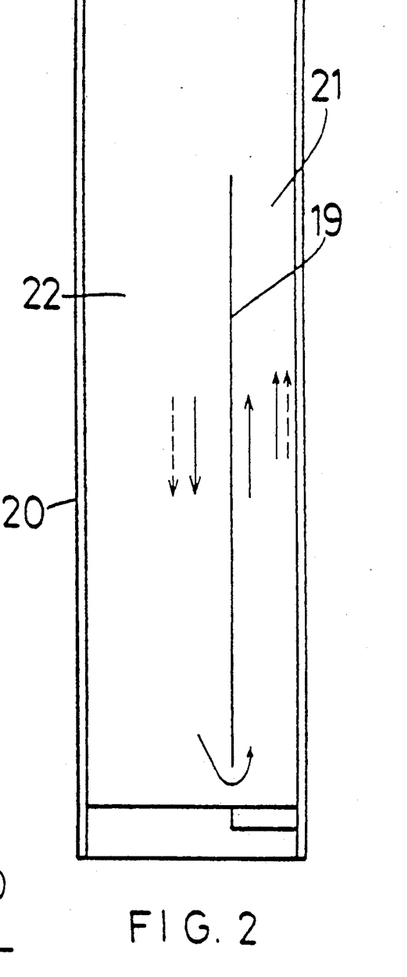

It is, as illustrated in FIG. 2, not necessary that the riser compartment be centrally located and a dividing wall 19 could be positioned to one side of the reaction vessel 20 so that the riser compartment 21 is located laterally adjacent the downcomer compartment 22 yet in the same vessel. In use, the fluidised bed reactor will operate in the same manner as that described above.

In all cases it is at least convenient, if not essential from a practical point of view, that the cross-sectional areas of the downcomer compartment is substantially larger than that of the riser compartment.

Figure 3:
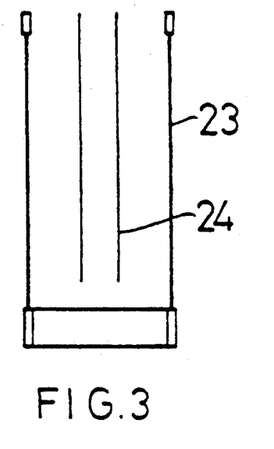
FIGS. 3, 4 & 5 illustrate, in schematic illustration, different arrangements of electrodes which can be employed.

Also the electrode arrangement described could be varied widely and, as illustrated in FIG. 3, the entire sidewall 23 of the reactor vessel and wall 24 of the central tube could be rendered conductive to thereby constitute electrodes. This would promote a flow of electricity transversely across the downcomer compartment.

Figure 4:
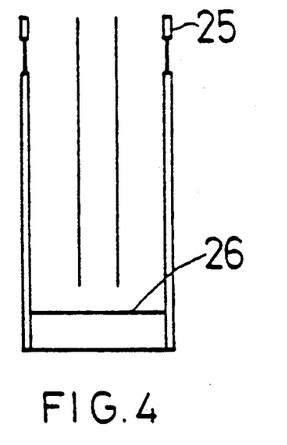
Figure 5:
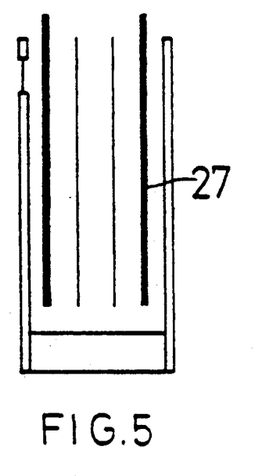

Alternatively, as illustrated in FIG. 4, an annular electrode 25 could be positioned at the top of the reactor vessel with a gas permeable floor 26 constituting the other electrode. Naturally, as illustrated in FIG. 5, simple electrodes 27 extending into the fluidised bed volume, generally in the down-comer compartment, could also be used.

The fluidising gas can, of course, be any suitable gas, which as indicated above, could be chosen to provide combustion in order to generate additional heat within the fluidised bed during operation.

Reverting now to the embodiment of the invention illustrated in FIG. 1, one particular application of a fluidised bed reactor according to this invention will now be described. This application is to the pyrolysis of pyrite which decomposes to form pyrrhotite and elemental sulphur when heated to a temperature of above about 600° C. In this particular application of the invention, the fluidised bed reactor is operated as described above and the fine pyrite material (90% passing 75 $\mu$m) to be decomposed is agglomerated into pellets of approximately 1 mm in diameter. The fluidising gaas employed is nitrogen and the conductive particles constituting the fluidised bed are activated carbon having a diameter of between 2 mm and 3 mm on average.

The advantage of employing the pyrite in pelletised form is that the pellets break up into the original powder only as the pyrite is converted to pyrrhotite and the pellets are retained within the reactor thereby ensuring that only reaction products pass through the outlet.

In an actual test conducted in a small electrically heated fluidised reactor of the type described above, the reactor was tested at temperatures of 800° C., 700° C., 600° C. and 550° C. on pelletised feed material whcih comprised 56% pyrite and 44% quartz. The cross-sectional area of the riser compartment was 5 cm² and that of the down-comer compartment was 52 cm². The flow rate of fluidising gas (nitrogen) was 40 liters/min. and the supply of electrical current to the electrodes was simply regulated to provide the required temperature. The feed rate of pelletised pyrite was 0.5 kg/hr. The electrical current was in fact 10 Amps. and the potential applied was 200 Volts for a power of 2 KW. The current was an alternating current.

There was complete conversion of pyrite to pyrrhotite in the runs carried out at 800° C., 700° C. and 600° C. but some unreacted pyrite remained in the product from the run carried out at 550° C.

It will be understood that numerous different applications exist for the apparatus and method of this invention and, in addition, numerous variations may be made to the above described equipment and general method of carrying out the invention without departing from the scope hereof.

A umber of further experiments were carried out in the electrically heated fluidized bed in which the energy required to convert the pyrite in a gold bearing pyrite flotation concentrate to pyrrhotite was determined. The pyrrhotite was processed further, ultimately yielding the formerly entrained gold and elemental sulphur. The details of this further processing are, however, outside the scope of the present patent application. The energy determinations were carried out as follows:

The electrically heated fluidized bed was provided with a kWh meter to measure the total energy consumption at any given time. Pelletised pyrite was fed at a predetermined rate and the unit was allowed to reach steady state. When steady state had been achieved, the reading on the kWh meter and the time were noted, along with the gas inlet and outlet temperatures. After half an hour rhe values of these parameters were again noted, and after about an hour all the readings were recorded again. Since the gas feed rates were known, along with the outlet and gas inlet temperatures, the power required to heat the gas could be calculated and subtracted from the total power consumed, as calculated from the kWh meter readings and recorded times.

The first two tests, Nos. 1 and 2, were done without any pyrite feed, to establish the heat losses from the unit. Once the heat losses were known, it was possible to subtract the power required to heat the fluidizing gas and the heat losses from the overall power consumption. The difference was the power required to convert a specific feed rate of pyrite to pyrrhotite. For tests Nos. 3 to 6, this pyrolysis power consumption was divided by the feed rate of pyrite concentrate to give the energy required to pyrolyse the pyrite concentrate. The average value of this pyrolysis energy requirement came to 0.377 kWh per kg of pyrite concentrate, with a standard deviation of 0.043 kWh/kg, or 11.4 per cent.

Theoretical calculations based on thermodynamic data gave a value of 0.364 kWh/kg which is within the standard deviation of the measured values. Table 1 lists the results of these tests. The fluidizing gas used was nitrogen and the temperature of the bed was maintained at 600° C. In Test 1 the flowrates of nitrogen were 3.36 kg/hour to the gas distributor (i.e. to the bottom of the unit) and 1.42 kg/hour to introduce the pyrite feed (i.e. to the top of the unit).

In tests 2 to 6 the nitrogen feed rate to the bottom of the unit was 2.88 kg/hour and that to the top of the unit was 1.42 kg/hour. In all the above tests (except 1 and 2 in which no pyrite was fed) the solids leaving the fluidized bed as dust in the exit gas were quenched in water and recovered by filtration. Subsequent processing showed that the conversion of pyrite to pyrrhotite was complete in all cases.

TABLE 1

| TEST NUMBER | | 1 | 2 | 3 | 4 | 5 | 6 |
|---|---|---|---|---|---|---|---|
| Gas Inlet Temperature | °C. | 25 | 22 | 24 | 25 | 24 | 25 |
| Gas Exit Temperature | °C. | 321 | 321 | 314 | 333 | 344 | 362 |
| Total Electrical Load | kW | 1,010 | 1,120 | 1,120 | 1,125 | 1,200 | 1,290 |
| Gas Heating Load | kW | 0,371 | 0,371 | 0,361 | 0,388 | 0,400 | 0,424 |
| Heat Losses | kW | 0,639 | 0,649 | 0,644 | 0,644 | 0,644 | 0,644 |
| Pyrolysis Heat Load | kW | | | 0,115 | 0,093 | 0,156 | 0,222 |
| Pyrite feed rate | kg/h | 0 | 0 | 0,296 | 0,296 | 0,384 | 0,556 |
| Pyrolysis energy | kWh/kg | | | 0,389 | 0,314 | 0,406 | 0,399 |

A further test was done, similarly to the latter six tests except that the fluidizing gas used was steam and not nitrogen. In this test the gas flowrate to the bottom of the unit was 1.8 kg/hour of steam at 109° C., and the gas entering with the pyrite feed was 1.42 kg/hour of nitrogen at ambient temperature. The pyrite feed rate was about 500 grams per hour. The solids from the fluidized bed were quenched in water and examined mineralogically. The pyrolysis product was pyrrhotite, with no pyrite being detected.

Tests were also done in which non-agglomerated fine pyrite concentrate was injected into the downward moving annular region of the reactor. Initial tests were carried out with a supply of nitrogen of 3.36 kg/hour to the bottom of the unit and 1.42 kg/hour together with the feed solids to the pyrite fines inlet. The temperature used was 600° C. Various feed rates of fine pyrite concentrate were used. The best conversion of pyrite to pyrrhotite achieved in this set of tests was about 75 per cent. Mineralogical analysis showed that the unconverted pyrite in the solids leaving the unit was present as unconverted cores surrounded by layers of pyrrhotite, and as unreacted particles of pyrite. The unconverted cores were due to the slightly too low operating temperature, and the unreacted particles were due to the upward entrainment of a portion of the fine pyrite particles fed directly to the unit exit without their passing through the hot reaction zone.

A further test was done in which non-agglomerated fine pyrite was injected into the downward moving annular region of the reactor. In this test the nitrogen gas feed rates were 1.74 kg/hr to the bottom of the unit and 0.34 kg/hr with the feed solids to the pyrite fines inlet. The activated carbon granules used in this test were smaller than those used in the other examples, being between 0.6 and about 1 mm in diameter instead of 2 mm-3 mm. The temperature of the fluidized bed was 700° C. instead of 600° C. and the pyrite feed rate was between 0.3 and 0.8 kg/hr. Mineralogical analysis of the subsequent reaction product showed that the pyrite had been completely converted to pyrrhotite, with no residual pyrite being detected.

Accordingly fines can be treated effectively in a furnace of this invention without agglomeration of any sort.

It will be understood that numerous different applications exist for the apparatus and method of this invention and, in addition, numerous variations may be made to the above described equipment and general method of carrying out the invention without departing from the scope hereof.

Figure 8:
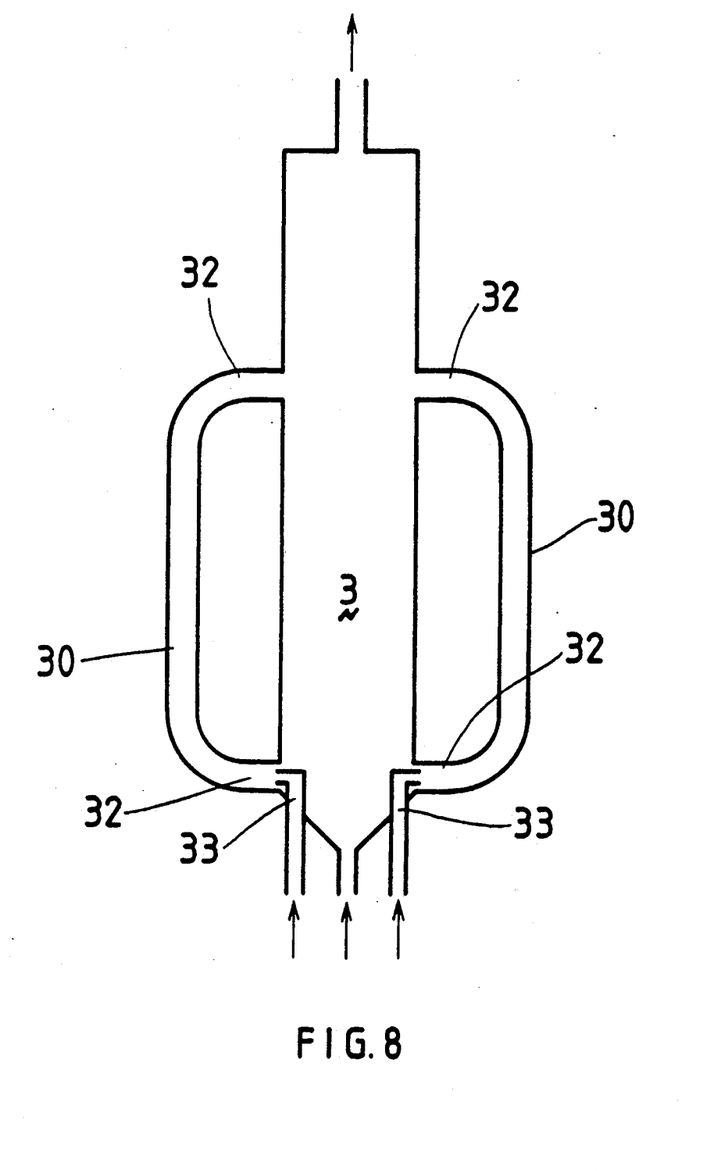
Figure 9:
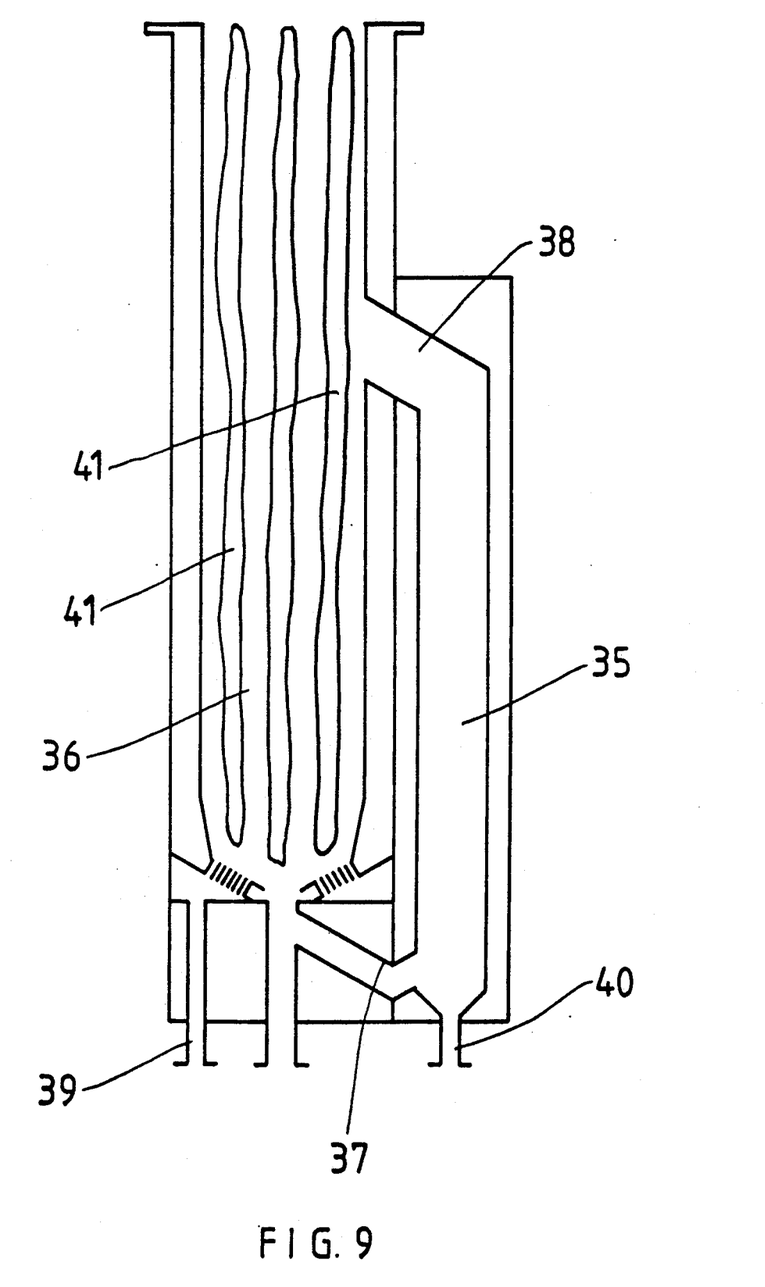

In particular, and a variation that may prove to be important from a practical point of view in the construction of the vessel assembly, is to provide separate, generally parallel, vessels forming the up-comer and down-comer compartments as shown in FIG. 8. In the illustrated variation two separate riser compartments 30 are located to the sides of a central down-comer compartment 31. The top and bottom of each riser compartment is simply connected to the down-comer compartment by transverse passages 32 and additional fluidizing gas is introduced into the riser compartments by supplementary inlets 33 directed into the lower ends of the riser compartments. Clearly any number of separate riser compartments could be arranged in the same way. A somewhat larger test reactor was made as illustrated in FIG. 9 and has proved to be successful. In this case a smaller diameter riser compartment 35 is laterally offset from a larger diameter downcomer compartment 36 with the lower end regions of the two compartments being interconnected by a somewhat downwardly and then upwardly inclined transfer tube 37. The upper end of the riser compartment is angled at an inclined back into the sidewall of the downcomer compartment as indicated by numeral 38.

In this case the different superficial velocities of the fluidising gas in the two compartments is taken care of by having totally separate fluidising gas inlets 39 and 40. The electrode arrangement, in this case, was three equally angularly spaced electrodes 41 extending parallel to the axis of the downcomer compartment and connected to a three-phase alternating current electrical supply.

In tests conducted on this apparatus similar results were achieved to those described above using graphite particles having about a 0.005 inches (1.3 mm) mean particle size and the same pyrite feed material mentioned above.

What is claimed is:

1. A method of carrying out an endothermic chemical reaction involving the use of at least one solid reactant in a fluidized bed reactor, wherein the reactor comprises a vessel assembly comprising at least one riser compartment and a down-comer compartment located adjacent each other and being interconnected at both their lower and upper end regions, said down-comer compartment having upper, central, and lower regions; each of said compartments having associated therewith means for introducing fluidizing gas therein and containing electrically conductive fluidizable particles; at least a solid reactant inlet to the vessel assembly for a solid reactant in subdivided form, wherein said inlet communicates with said upper or central region of the down-comer compartment; at least one outlet communicating with the upper end regions of said compartments wherein spent fluidizing gas and accompanying reaction products are removed; and electrodes associated with the vessel assembly and adapted to pass an electrical current through at least a selected zone of said fluidized bed therein, the method of comprising:

(a) introducing fluidizing gas into lower regions of both the down-comer and riser compartments, whereby in the down-comer compartment, the fluidizable particles are substantially in a state of incipient fluidization and having a superficial fluidizing gas velocity in the riser compartment at least intermittently higher than in the down-comer to thereby cause at least intermittent movement of the fluidizable particles up the riser compartment and over onto the upper region of the down-comer compartment, and a simultaneous downward movement of fluidizable particles in the down-comer compartment;

(b) introducing said at least one solid reactant through said solid reactant inlet to said upper or central region of said down-comer compartment, said reactant being in solid subdivided form, whereby it becomes entrained with the fluidizable particles and moves counter-currently to the flow of fluidizing gas;

(c) passing an electrical current between said electrodes to heat, by resistive heating, said fluidizable particles; and (d) removing spent fluidizing gas together with reaction products accompanying same through the outlet.

2. A method as claimed in claim 1 in which the solid subdivided reactant has a substantially smaller particle size than that of fluidizable particles.

3. A method as claimed in claim 2 in which the average particle size of the fluidizable particles is at least five times that of the particles of solid, subdivided reactant.

4. A method as claimed in calim 2 in which the average particle size of the fluidizable particles is at least eight times that of the particles of solid subdivided reactant.

5. A method as claimed in claim 3 in which the solid subdivided reactant is introduced into the down-comer compartment in agglomerated form which breaks down to provide particulate reactant within the fluidized bed.

6. A method as claimed in claim 1 in which the solid subdivided reactant is pneumatically introduced into the down-comer compartment in a carrier gas.

7. A method as claimed in claim 1 in which finely divided reaction products are formed and the at least intermittently higher superficial fluidizing gas velocity in the riser compartment carries such reaction products out of the riser compartment and out of the outlet together with the spent fluidizing gas.

8. A method as claimed in claim 1 in which the fluidizing gas embodies at least one gaseous reactant.

9. A method as claimed in claim 1 in which the fluidizable particles are carbonaceous material.

10. A method as claimed in claim 9 in which the fluidizable particles are graphite particles.

11. A method as claimed in claim 1 in which the chemical reaction is the thermal decomposition of constituent materials in gold bearing pyrite, arsenopyrite or mixtures thereof which constitute said solid subdivided reactant.

12. A method as claimed in claim 11 which is carried out in the absence of oxygen and the fluidizing gas is nitrogen, argon, neon, carbon dioxide, stream or mixtures thereof.

13. A method as claimed in claim 12 in which the solid reactant is finely subdivided and has an average particle size of less than about 0.004 inches (100 μm).

14. A method as claimed in claim 13 in which the average particle size of the fluidizable particles is from about 0.04 to 0.12 inches (1 to 3 mm).

15. The method according to claim 1 wherein the cross-sectional area of said down-comer compartment is larger than the cross-sectional area of said riser compartment.

16. The method according to claim 15 wherein said riser is located on one side of the downcomer, said lower regions of said downcomer and said riser being interconnected by a tube which is first downwardly inclined from the riser and then upwardly inclined, said upper end being interconnected to the upper end of said downcomer by a tube which is upwardly inclined from said riser to said downcomer, said reactor having two fluidizing gas inlets and three electrodes extending parallel to the axis of the downcomer.

17. A method of carrying out an endothermic chemical reaction involving the use of at least one finely subdivided solid reactant in a fluidized bed reactor, wherein the reactor comprises a vessel assembly comprising at least one riser compartment and a downcomer compartment located adjacent each other and being interconnected at both their lower and upper end regions, said downcomer compartment having upper, central and lower regions; each of said compartments having associated therewith means for introducing fluidizing gas therein and containing electrically conductive fluidizable particles having an average particle size of about 0.004 to 0.12 inches (1 to 3 mm); at least a solid reactant inlet to the vessel assembly for a solid reactant in subdivided form, wherein said inlet communicates with said upper or central region of the down-comer compartment; at least one outlet communicating with the upper end regions of said compartment wherein spent fluidizing gas and accompanying reaction products are removed and electrodes associated with the vessel assembly and adapted to pass an electrical current through at least a selected zone of a fluidized bed therein, the method comprising:

(a) introducing fluidizing gas into the lower regions of both the down-comer and riser compartments whereby in the down-comer compartment, the fluidizable particles are substantially in a state of incipient fluidization and the superficial fluidizing gas velocity in the riser compartment is higher than that in the down-comer compartment, to thereby cause movement of said fluidizable particles up the riser compartment and over onto the upper region of the down-comer compartment and a simultaneous downward movement of the fluidizable particles in the down-comer compartment;

(b) introducing said at least one solid reactant through said solid reactant inlet to said upper or central region of said down-comer compartment, said reactant being in solid subdivided form and having an average particle size of less than about 0.004 inches (100 μm), to thereby cause said reactant to become entrained with the fluidizable particles whereby said fluidizable particles move counter-currently to the flow of fluidizing gas;

(c) passing an electrical current between said electrodes to heat, by resistive heating, said fluidizable particles; and (d) removing spent fluidizing gas together with reaction products accompanying same through the outlet.

* * * * *